United States Patent
Li et al.

(10) Patent No.: US 11,699,926 B2
(45) Date of Patent: Jul. 11, 2023

(54) SMART HUB

(71) Applicant: TAMKANG UNIVERSITY, New Taipei (TW)

(72) Inventors: Ching-Lieh Li, New Taipei (TW); Yu-Jen Chi, New Taipei (TW); Hsiu-Ping Lin, New Taipei (TW)

(73) Assignee: TAMKANG UNIVERSITY, New Taipei (TW)

( * ) Notice: Subject to any disclaimer, the term of this patent is extended or adjusted under 35 U.S.C. 154(b) by 232 days.

(21) Appl. No.: 17/368,876

(22) Filed: Jul. 7, 2021

(65) Prior Publication Data

US 2022/0368172 A1 Nov. 17, 2022

(30) Foreign Application Priority Data

May 17, 2021 (TW) ................................ 110117693

(51) Int. Cl.
*H02J 50/80* (2016.01)
*H04W 4/38* (2018.01)
*H04W 4/80* (2018.01)
*H02J 50/00* (2016.01)

(52) U.S. Cl.
CPC ............ *H02J 50/80* (2016.02); *H02J 50/005* (2020.01); *H04W 4/38* (2018.02); *H04W 4/80* (2018.02)

(58) Field of Classification Search
CPC ......... H02J 50/80; H02J 50/005; H04W 4/38; H04W 4/80
See application file for complete search history.

(56) References Cited

U.S. PATENT DOCUMENTS

| | | | |
|---|---|---|---|
| 10,862,343 B2* | 12/2020 | Su | H02J 50/001 |
| 2012/0105210 A1* | 5/2012 | Smith | G06K 19/0723 340/10.1 |
| 2017/0141818 A1* | 5/2017 | Umeda | H04W 4/80 |
| 2018/0165481 A1* | 6/2018 | Doescher | G06K 19/0707 |
| 2019/0074717 A1* | 3/2019 | Tsukamoto | H04B 5/0037 |
| 2019/0181688 A1* | 6/2019 | Su | H04B 5/0037 |
| 2021/0066972 A1* | 3/2021 | Chen | H02J 50/80 |
| 2021/0368439 A1* | 11/2021 | Karimaruthumkal | H04L 5/0055 |

(Continued)

FOREIGN PATENT DOCUMENTS

| | | | | |
|---|---|---|---|---|
| CN | 107646161 B | * | 7/2022 | H02J 50/12 |
| EP | 3493097 A1 | * | 6/2019 | G06K 19/0723 |
| JP | 2023022032 A | * | 2/2023 | H02J 50/27 |

(Continued)

*Primary Examiner* — Adam D Houston
(74) *Attorney, Agent, or Firm* — WPAT, PC

(57) ABSTRACT

A smart hub is provided, which includes a control circuit and an antenna array (the functions thereof include transmitting/receiving scanning signals and transmitting wireless power transfer signals). The antenna array is connected to the control circuit and transmits a scanning signal to scan within an effective scanning range thereof. When the antenna array receives the reflected signal of the scanning signal, the control circuit controls the antenna array to keep transmitting a wireless power transfer signal, within a predetermined time interval, in the direction of receiving the reflected signal, and simultaneously receives the device information from a sensor which may exist via the antenna array within the predetermined time interval. The device information is generated by the sensor by backscattering.

17 Claims, 9 Drawing Sheets

(56) References Cited

U.S. PATENT DOCUMENTS

2022/0021240 A1* 1/2022 Li ........................... H02J 7/345
2022/0368172 A1* 11/2022 Li ........................ H04B 5/0037

FOREIGN PATENT DOCUMENTS

| KR | 20210122235 A | * | 10/2021 | | |
|----|---------------|---|---------|---|---|
| KR | 20220017545 A | * | 2/2022 | | |
| WO | WO-2021059453 A1 | * | 4/2021 | ............. | H02J 50/27 |
| WO | WO-2022055114 A1 | * | 3/2022 | | |

* cited by examiner

SMART HUB

CROSS REFERENCE TO RELATED APPLICATION

All related applications are incorporated by reference. The present application is based on, and claims priority from, Taiwan Application Serial Number 110117693, filed on May 17, 2021, the disclosure of which is hereby incorporated by reference herein in its entirety.

TECHNICAL FIELD

The technical field relates to a hub, in particular to a smart hub.

BACKGROUND

Internet-of-Things (IoT) technology can connect various physical objects with one another via sensors and an application programming interface (API), such that the physical objects can be connected to one another via Internet for data exchange. Currently, many IoT technologies have been developed in order to satisfy the requirements of different applications.

However, an IoT system usually needs a large number of IoT sensors so as to collect information. Although the IoT sensors are of low power consumption, these sensors still need to be powered by batteries, or these sensors cannot normally operate. Therefore, once the battery of any one of the IoT sensors has run out, the IoT sensor cannot normally work, which would influence the normal operation of the IoT system.

Besides, once the battery of any one of the IoT sensors has run out, the user should charge the IoT sensor or replace the battery of the IoT sensor, which would waste a lot of manpower and significantly increase the cost of the IoT system. Further, these wasted batteries will lead to another environmental issue.

SUMMARY

An embodiment of the disclosure relates to a smart hub, which includes a control circuit and an antenna array (the functions of the antenna array include transmitting a scanning signal, receiving the reflected signal of the scanning signal and transmitting a wireless power transfer signal). The antenna array transmits a scanning signal to search for a sensor within an effective scanning range. The sensor may be in on state, off state, sleep state or battery-exhausted state. When the antenna array receives the reflected signal of the scanning signal, the control circuit controls the antenna array to keep transmitting a wireless power transfer signal, within a predetermined time interval, in the direction of receiving the reflected signal, and receives a device information generated by the sensor via backscattering within the predetermined time interval. When the control circuit confirms that the device information is valid, the control circuit controls the antenna array to keep transmitting the wireless power transfer signal in the direction of receiving the reflected signal so as to charge the sensor and then activate the sensor.

As described above, the smart hub according to the embodiments of the disclosure may have the following advantages:

(1) In one embodiment of the disclosure, the smart hub can scan the surroundings to search for the sensors of an IoT system via an antenna array and transmits a wireless power transfer signal to charge any one of the sensors in battery-exhausted state. Thus, the sensor can swiftly obtain enough electricity and be activated in a short time, which can effectively decrease the demand of manpower and reduce the cost of the IoT system.

(2) In one embodiment of the disclosure, the smart hub can identify the sensor belonging to the IoT system via a special RFID-like communication mode. Therefore, the smart hub can correctly identify the sensor even if the sensor has not been activated yet and the smart hub can keep transmitting the wireless power transfer signal to the sensor in battery-exhausted state via the antenna array in order to charge the sensor. Accordingly, the IoT system can always work normally.

(3) In one embodiment of the disclosure, the smart hub includes a smart antenna array, which can provide several scanning modes, such that the smart antenna array can scan from near to far or simultaneously perform scanning in different directions. Accordingly, the smart hub can more effectively search for the sensors belonging to the IoT system.

(4) In one embodiment of the disclosure, the antenna array of the smart hub is of circular polarization or the scanning signal thereof has a digital identification code and/or hub identification code. Thus, the smart hub can effectively prevent the interferences from the background or other signal sources with a view to increase the detection accuracy and the scanning efficiency.

(5) In one embodiment of the disclosure, the smart hub can communicate with other smart hubs of the IoT system to form a hub group. The smart hubs belonging to the hub group can concurrently perform scanning and share data with each other, so can achieve great cooperation.

(6) In one embodiment of the disclosure, the smart hub can achieve the desired technical effects without significantly increasing the cost thereof, so has high commercial value.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The disclosure will become more fully understood from the detailed description given herein below and the accompanying drawings which are given by way of illustration only, and thus are not limitative of the disclosure and wherein.

DETAILED DESCRIPTION

Figure 1:
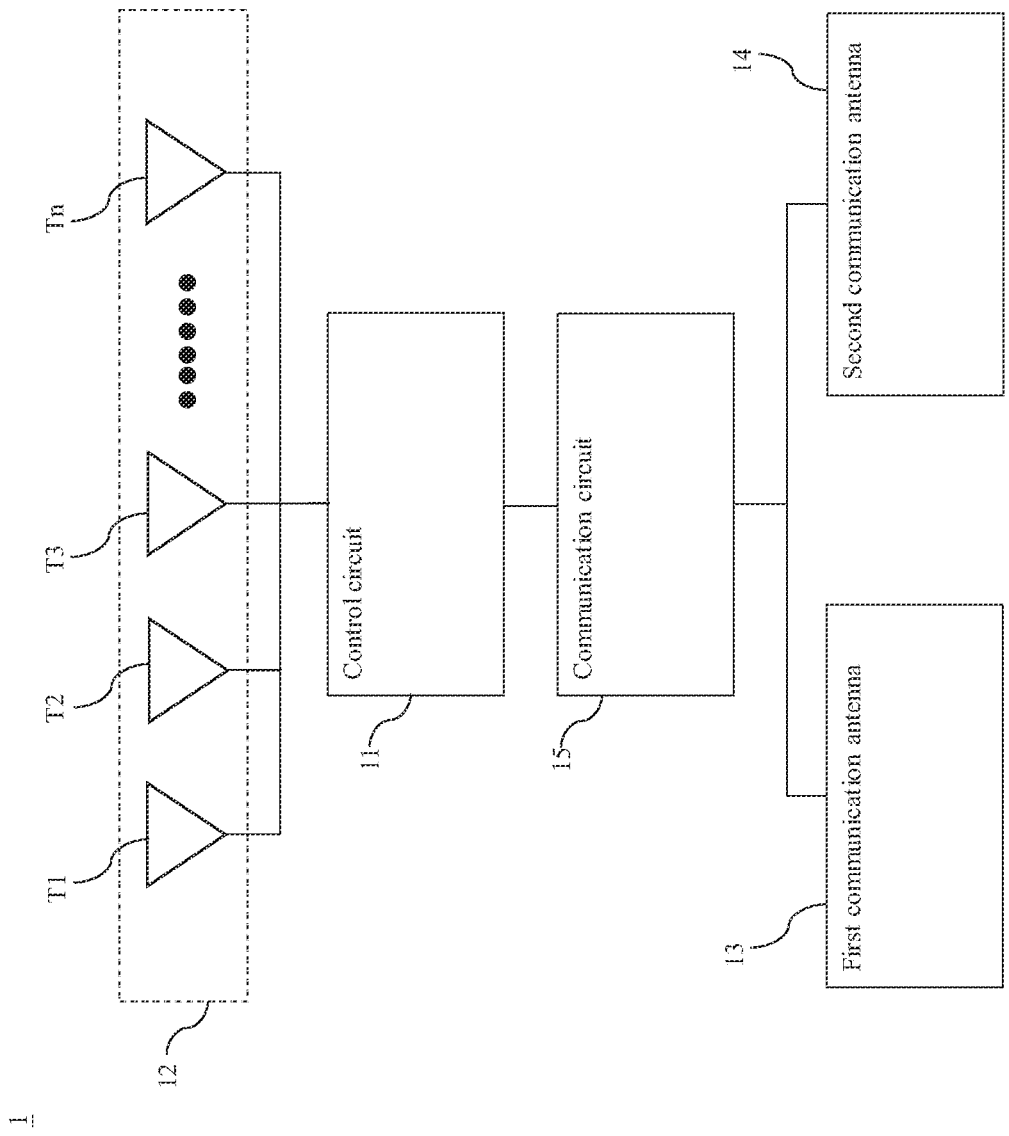
FIG. 1 is a block diagram of a smart hub in according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2A:
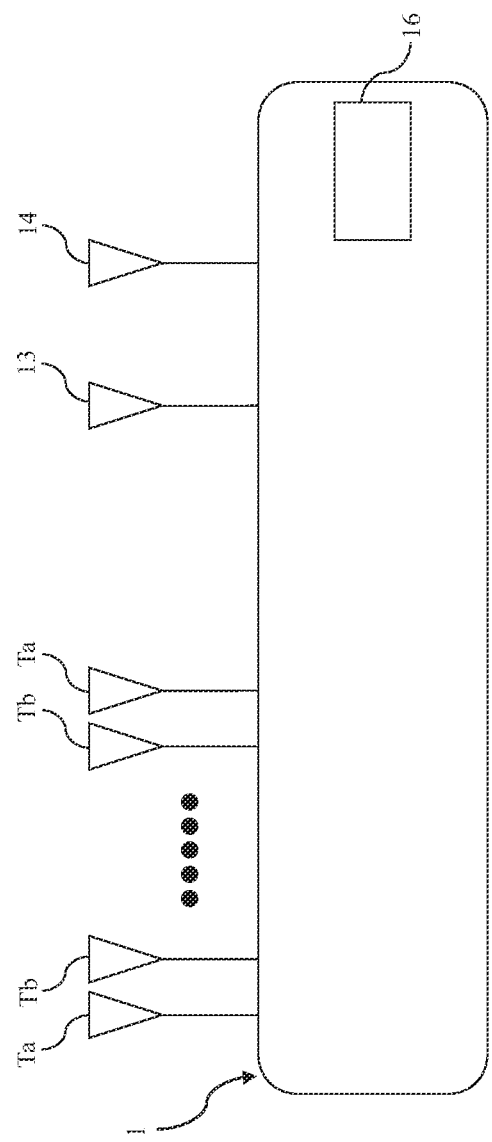
FIG. 2A is a first schematic view of the smart hub in according to one embodiment of the disclosure.

Please refer to FIG. 1 and FIG. 2A-FIG. 2D, which are a block diagram, a first schematic view, a second schematic view, a third schematic view and a fourth schematic view of a smart hub in according to one embodiment of the disclosure respectively. As shown in FIG. 1 and FIG. 2A, the smart hub 1 includes a control circuit 11, an antenna array 12, a first communication antenna 13, a second communication antenna 14 and a communication circuit 15. A number of smart hubs 1 and sensors R can be distributed over a space to form an IoT system. The sensors R may be target identification devices, door/window sensors, temperature sensors, moisture sensors, illuminance sensors, various gas sensors, particulate matter sensors, or other IoT devices or sensors with different functions.

The antenna array 12 is connected to the control circuit 11 and includes a plurality of antenna units T1~Tn. The antenna units T1~Tn include a plurality of scanning antenna units Ta. In one embodiment, the control circuit 11 may include a microcontroller unit (MCU), a central processing unit (CPU) or other similar components.

The antenna units T1~Tn further include a plurality of wireless power transfer antenna units Tb. In this embodiment, some of the antenna units T1~Tn may form the scanning antenna units Ta and the other may form the wireless power transfer antenna units Tb; alternatively, all of the antenna units T1~Tn may form the scanning antenna units Ta or the wireless power transfer antenna units Tb. Each of the antenna units T1~Tn can be switched between the scanning antenna unit Ta and the wireless power transfer antenna unit Tb, such that the antenna units T1~Tn can separately perform scanning and wireless power transferring (if there is only one sensor) or simultaneously performing scanning and wireless power transferring (if there are two or more sensors).

The first communication antenna 13 is connected to the communication circuit 15, such that the communication circuit 15 can communicate with the sensors R. In this embodiment, the first communication antenna 13 may adopt Bluetooth communication protocol. In another embodiment, the first communication antenna 13 may be adopt ZigBee communication protocol or other communication protocols with low power consumption. In still another embodiment, the first communication antenna 13 may adopt WiFi communication protocol or other currently available communication protocols.

The second communication antenna 14 is connected to the communication circuit 15, so the communication circuit 15 can also communicate with other smart hubs 1. In this embodiment, the second communication antenna 14 may adopt WiFi communication protocol. In another embodiment, the second communication antenna 14 may adopt other communication protocols.

In addition, the smart hub 1 may further include a network interface 16 connected to the communication circuit 15, so the communication circuit 15 can be connected to Internet via the network interface 16 and a network cable. For example, the network interface 16 may be a WAN port, a LAN port or other network ports.

Figure 2B:
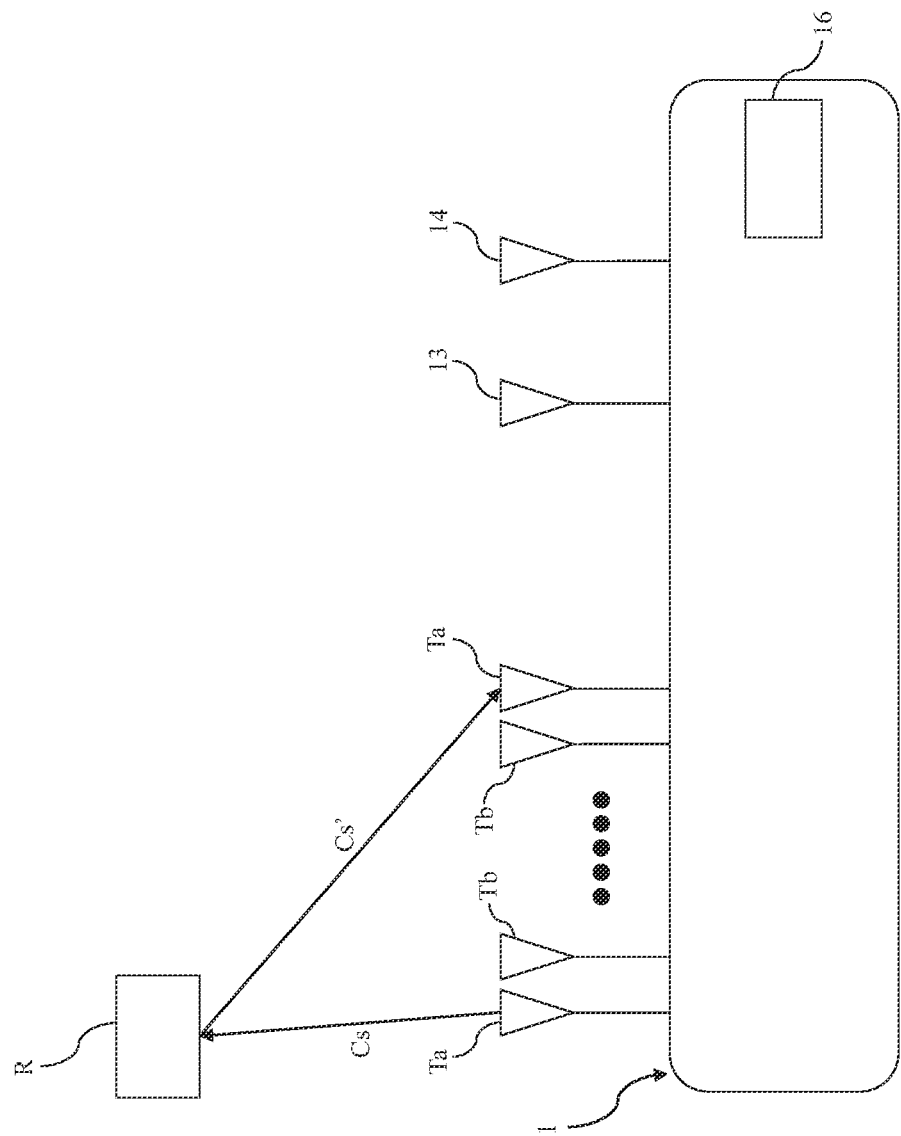
FIG. 2B is a second schematic view of the smart hub in according to one embodiment of the disclosure.

As shown in FIG. 2B, the antenna array 12 (some of the antenna units T1~Tn thereof serve as the scanning antenna units Ta) transmits a scanning signal Cs to performing scanning within a predetermined range and then receives the reflected signal Cs' of the scanning signal Cs (the antenna units T1~Tn can simultaneously receive the reflected signal Cs' or receive the reflected signal Cs' via switching). Then, the antenna array 12 transfers the reflected signal Cs' to the control circuit 11 so as to search for the sensor R of the IoT system. The sensor R may be in on state, off state, sleep state or battery-exhausted state. Moreover, the sensor R includes a group of retrodirective searching antennas, which can form the reflected signal Cs' after receiving the scanning signal Cs and directly radiate the reflected signal Cs in the direction toward the source of the scanning signal Cs. The details of the retrodirective searching antennas are supposed to be known by those skilled in the art, so will not be described therein.

Figure 2C:
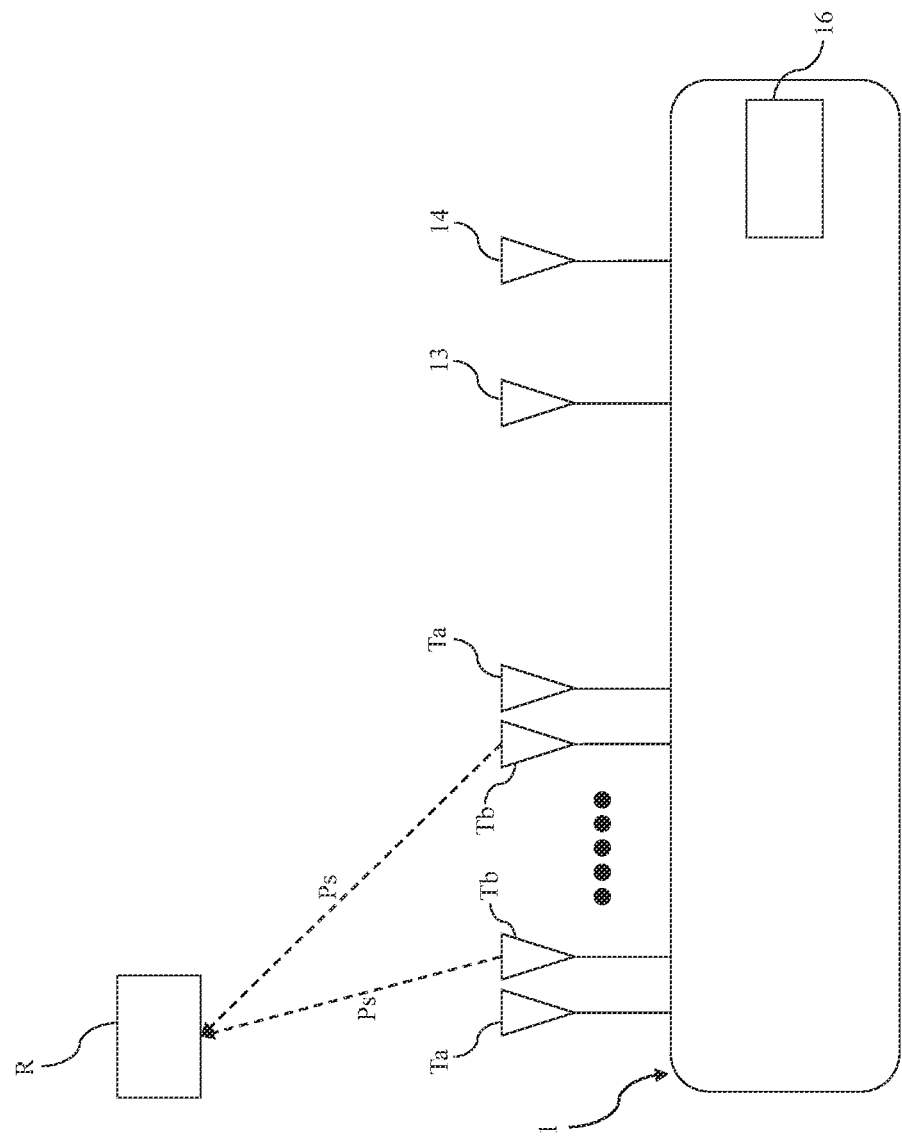
FIG. 2C is a third schematic view of the smart hub in according to one embodiment of the disclosure.

Afterward, as shown in FIG. 2C, if the sensor R has been in the battery-exhausted state, the control circuit 11 controls the antenna array 12 (some of the antenna units T1~Tn thereof have been switched to serve as the wireless power transfer antenna units Tb) to keep transmitting a wireless power transfer signal Ps in the direction of receiving the reflected signal Cs' within a predetermined time period in order to charge the sensor R. Alternatively, the control circuit 11 can also switch all of the antenna units T1~Tn of the antenna array 12 to serve as the wireless power transfer antenna units Tb to further concentrate the beam thereof in order to enhance the charging effect and more effectively charge the sensor R. In one embodiment the smart hub 1 can have a coexistence design provided for the first communication antenna 13, the second communication antenna 14 and other antennas of the frequency bands close thereto. The design can realize the application of integrating four or more RF channels or switch between these RF channels. The antenna array 12 may be a co-channel system or a frequency-division system when simultaneously implementing scanning and wireless power transferring; the frequency-division system can reduce interferences when performing multi-point scanning and communication, so can achieve greater communication quality.

Figure 2D:
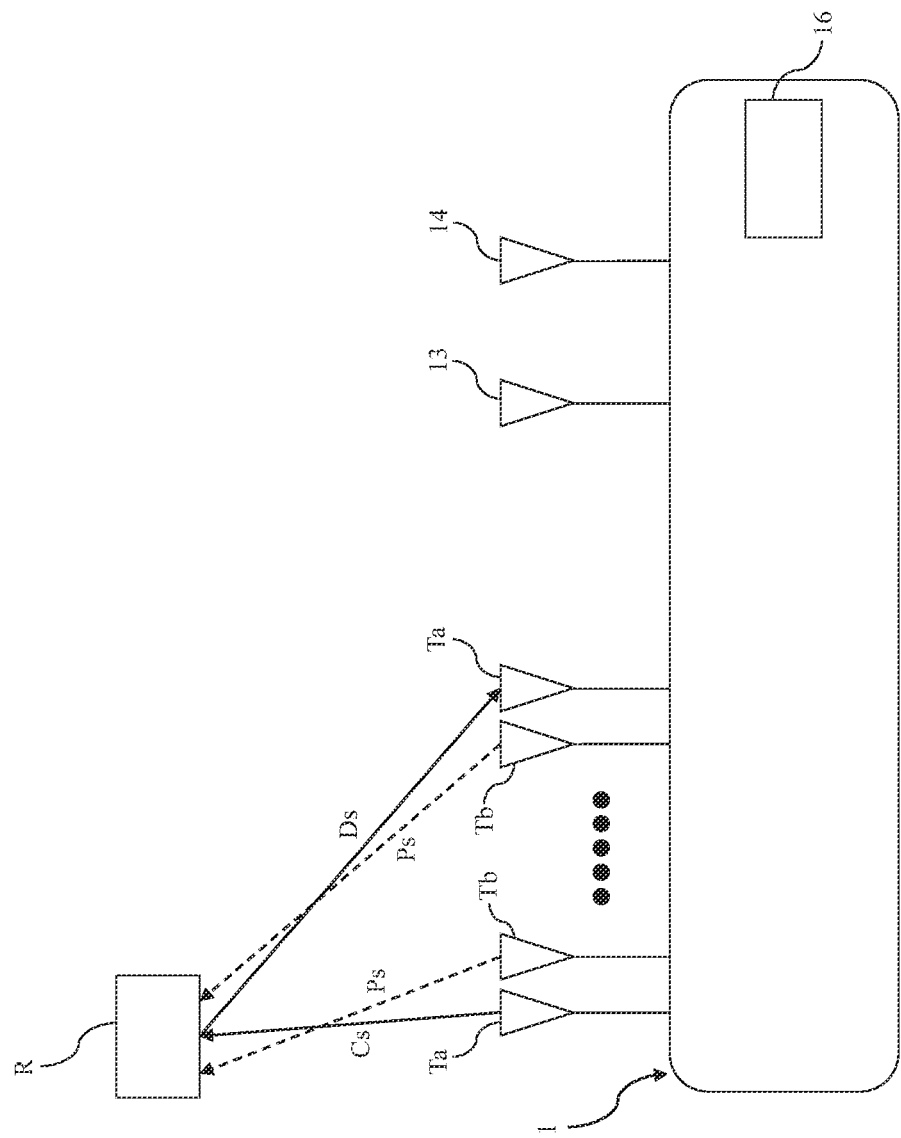
FIG. 2D is a fourth schematic view of the smart hub in according to one embodiment of the disclosure.

Next, as shown in FIG. 2D, the sensor R further includes a switch connected to the retrodirective searching antennas. When the charge state of the sensor R reaches an initial threshold value, the sensor R can activate a backscatter communication mechanism based on a RFID-like communication mode. When the switch is in on state, the control circuit 11 can receive the reflected signal Cs' from the retrodirective searching antennas. On the contrary, when the switch is in off state, the control circuit 11 cannot receive the reflected signal Cs'. Accordingly, the sensor R can generate a digital signal by controlling the switch according to the backscatter communication mechanism based on the RFID-like communication mode (the switch in on state stands for 1 and the switch in off state stands for 0). In addition, the digital signal can be received by the control circuit 11 via the aforementioned backscatter communication mechanism. In this way, the sensor R can control the switch to continuously switch between on state and off state even with very low electricity and generate the device information Ds to serve as the response by backscattering within the aforementioned predetermined time period. In this way, the control circuit 11 can receive the device information Ds generated by the sensor R via backscattering. In this embodiment, the device information Ds may include the identification code and the charge state of the sensor R, such that the control circuit 11 can confirm that the sensor R do belong to the IoT system and obtain the charge state of the sensor R. In addition, the device information Ds may further include one or more of the safety code and the input/output (I/O) state of the sensor R.

When the control circuit 11 receives a reflected signal Cs' in a certain direction and determines that there may be a sensor R in the direction, the control circuit 11 can control the antenna array 12 to keep transmitting the wireless power transfer signal Ps in the direction in order to charge the sensor R. When the charge state of the sensor R reaches a first threshold value, the sensor R can generate the aforementioned device information Ds. When the charge state of the sensor R reaches a second threshold value, the sensor R can activate more communication functions. At the moment, the control circuit 11 can communicate with other devices by the first communication antenna 13 via Bluetooth communication protocol, so the sensor R can transmit the sensing data to the control circuit 11. The control circuit 11 can judge the charge state of the sensor R according to the device information Ds. Then, the control circuit 11 can estimate the time needed for fully charging the sensor R and the time needed for activating the sensor R according to the charge state of the sensor R and the strength of the reflected signal Cs'.

When the control circuit 11 receives a reflected signal Cs' in a certain direction and determines there may be a sensor R in the direction, the control circuit 11 can control the antenna array 12 to keep transmitting the wireless power transfer signal Ps in the direction in order to charge the sensor R which may exist. However, when the control circuit 11 fails to receive the backscattering signal (device information Ds) generated by the sensor R via the RFID-like communication mode within the predetermined time period, the control circuit 11 control the antenna array 12 to transmit the scanning signal Cs in another direction in order to search for other sensors R.

In practical situations, the aforementioned reflected signal Cs' may not be reflected by other objects rather than the sensor R. Therefore, when the smart hub 1 fails to receive the backscattering signal (device information Ds) within the predetermined time period, the smart hub 1 determines that the source of the reflected signal Cs' is not one of the sensors R of the IoT system (i.e. the smart hub 1 does not match the object). At the moment, the smart hub 1 can continue to search for other sensors R. In general, the smart hub 1 can charge the sensor R to have the charge state of the sensor R reach the first threshold value and the second threshold value in a short time.

As set forth above, the smart hub 1 can perform scanning to search for the sensor R around the smart hub 1 via the antenna array 12 and execute wireless power transferring to charge the sensor R in battery-exhausted state via the antenna array 12. Thus, the sensor R can swiftly obtain enough electricity and be activated in a short time, which can effectively reduce the demand of manpower and decrease the cost of the IoT system. Further, the smart hub 1 can obtain the identification code of the sensor R via the backscatter communication mechanism based on the RFID-like communication mode with a view to determine whether the sensor R belongs to the IoT system. In this way, the smart hub 1 can correctly identify the sensor R even if the sensor R has not be fully activated yet. Then, the smart hub 1 can perform wireless power transferring via the antenna array 12 in order to charge the sensor R in battery-exhausted state, so the IoT system can always work normally. Via the above mechanism, the battery of the sensor R does not need to be replaced within the whole product life cycle thereof, which can satisfy the requirements of energy-saving and environmental protection.

Furthermore, the control circuit 11 can communicate with other smart hubs 1 of the IoT system via the second communication antenna 14 to form a hub group in order to concurrently performing scanning. When the smart hubs 1 of the hub group receives the device information Ds transmitted from the same sensor R, each of the smart hubs 1 can determine the distances between the smart hub 1 and the sensor R according to the strength of the reflected signal Cs' combined with switch controlling. Afterward, the smart hub 1 closest to the sensor R serves as the master device to aim at the direction of receiving the reflected signal Cs' and keep transmitting the wireless power transfer signal Ps so as to charge the sensor R and then receive the device information Ds from the sensor R. Finally, the smart hub 1 can activate the sensor R and communicate with the sensor 1. If the sensor R moves away from the smart hub 1 serving as the master device and then moves toward another smart hub 1 of the hub group, the smart hub 1 originally serving as the master device hands over the role of master device to the smart hub 1 currently closest to the sensor R (the smart hub 1 that is closest to the sensor R or the strength of the reflected signal Cs' received by the smart hub 1 is higher). The aforementioned hand-over mechanism will not be influenced by the on/off state of the communication module of the sensor R and will not stop until the sensor R moves away from the detection range of the hub group. In addition, the control circuit 11 can transmit the data collected thereby to the other smart hubs 1 of the hub group, such that the smart hubs 1 of the hub group can share the data with each other in order to achieve great cooperation.

If the antenna array 12 searches out a sensor R in off state and not in battery-exhausted state by scanning (when the sensor R not in battery-exhausted state is idle, the sensor R can be set to be in off state or sleep state in order to decrease the power consumption thereof), the control circuit 11 can control the antenna array 12 to target the direction of receiving the reflected signal Cs' and transmit the wireless power transfer signal Ps in this direction. In this case, the sensor R can generate the device information Ds, in a very short time, to serve as the response via the backscatter communication mechanism based on the RFID-like communication mode. Then, the control circuit 11 awakes the sensor R based on the RFID-like communication mode. At the moment, the control circuit 11 can judge the charge state of the sensor R according to the device information Ds and determine whether to charge the sensor R or directly communicate with the sensor R according to the charge state of the sensor R.

If the antenna array 12 searches out a sensor R in on state and not in battery-exhausted state by scanning and the control circuit 11 receives the reflected signal Cs', of the scanning signal Cs, from the sensor R, the sensor R can immediately generate the device information Ds to serve as the response via the backscatter communication mechanism based on the RFID-like communication mode. At the moment, the control circuit 11 can judge the charge state of the sensor R according to the device information Ds and determine whether to charge the sensor R or directly communicate with the sensor R according to the charge state of the sensor R.

In practical situations, the aforementioned reflected signal Cs' may be reflected by other objects rather than the sensor R. Therefore, when the smart hub 1 fails to receive the backscattering signal (device information Ds) within the predetermined time period, the smart hub 1 cannot execute the confirmation operation. In this case, the smart hub 1 determines that the source of the reflected signal Cs' is not one of the sensors R of the IoT system (i.e. the smart hub 1 does not match the object). At the moment, the smart hub 1 can continue to search for other sensors R in other directions. In general, the smart hub 1 can charge the sensor R to have the charge state of the sensor R reach the first threshold value in a short time.

In practical situations, the aforementioned reflected signal Cs' may be generated by other objects (e.g. iron cabinet, iron racking or other metal objects) instead of the IoT sensor R. Therefore, the antenna units of the antenna array 12 can be designed to be of circular polarization and the retrodirective searching antennas of the sensor R can be also correspondingly designed to be of circular polarization (left circle or right circle). As the polarization of the antenna array 12 is corresponding to that of the retrodirective searching antennas of the sensor R, the reflected signal Cs' generated by the retrodirective searching antennas of the sensor R can be effectively received by the antenna array 12. However, other objects have not an antenna whose polarization is corresponding to that of the antenna array 12, so the reflected signals generated by other objects cannot be well received by the antenna array 12, which can effectively prevent from the interferences caused by other objects in the environment.

Further, the scanning signal Cs of the antenna array 12 of each smart hub 1 can further have its own hub identification code, which may be a digital signal. If the antenna array 12 of the smart hub 1 transmits a scanning signal Cs and then receives a reflected signal Cs' having the hub identification code, the smart hub 1 can determine that the reflected signal Cs' must be generated by reflecting its own scanning signal Cs. Thus, when two or more smart hubs 1 adjacent to each other receive a reflected signal Cs' generated by the same sensor R, each of the smart hubs 1 can determine, according to the hub identification code of the reflected signal Cs', whether the reflected signal Cs' is generated by reflecting its own scanning signal Cs. As a result, this mechanism can effectively avoid that these smart hubs 1 interfere with each other.

Moreover, if there is a signal source which can actively generate signals (e.g. an access point), the smart hub 1 may receive the signal generated by the signal source and mistake the signal as the reflected signal Cs' of its own scanning signal Cs. Accordingly, the scanning signals Cs of the antenna arrays 12 of all smart hubs 1 in the IoT system can further have a digital identification, which may be a digital signal. In this way, if one of the smart hubs 1 receives a signal generated by the signal source, the smart hub 1 can determine whether the signal is the reflected signal Cs' of its own scanning signal Cs according to whether the received signal has the digital identification code. This mechanism can effectively avoid that the smart hubs 1 are interfered by the signal sources in the environment.

As set forth above, the antenna array 12 of the smart hub 1 is of circular polarization or its scanning signal Cs has the digital identification code and/or hub identification code, so the smart hub 1 can effectively prevent from the interferences from the background or other signal sources. Accordingly, the detection accuracy and the scanning efficiency of the smart hub 1 can be dramatically enhanced.

The embodiment just exemplifies the disclosure and is not intended to limit the scope of the disclosure. Any equivalent modification and variation according to the spirit of the disclosure is to be also included within the scope of the following claims and their equivalents.

It is worthy to point out that currently available IoT sensors have no effective charging mechanism Therefore, once the battery of any one of the IoT sensors has run out, the IoT sensor cannot normally work, which would influence the normal operation of the IoT system. On the contrary, according to one embodiment of the disclosure, the smart hub can identify a sensor belonging to the IoT system via a special RFID-like communication mode. Therefore, the smart hub can correctly identify the sensor even if the sensor has not been activated yet and the smart hub can keep transmitting a wireless power transfer signal to the sensor in battery-exhausted state via the antenna array in order to charge the sensor. Accordingly, the IoT system can always work normally.

Besides, once the battery of any one of the currently available IoT sensors has run out, the user should charge the IoT sensor or replace the battery of the IoT sensor, which would waste a lot of manpower and significantly increase the cost of the IoT system. On the contrary, according to one embodiment of the disclosure, the smart hub can scan the surroundings to search for the sensors of the IoT system via an antenna array and transmits the wireless power transfer signal to charge any one of the sensors in battery-exhausted state. Thus, the sensor can swiftly obtain enough electricity and be activated in a short time, which can effectively decrease the demand of manpower and reduce the cost of the IoT system.

Further, according to one embodiment of the disclosure, the antenna array of the smart hub is of circular polarization or the scanning signal thereof has a digital identification code and/or hub identification code. Thus, the smart hub can effectively prevent the interferences from the background or other signal sources with a view to increase the detection accuracy and the scanning efficiency.

Moreover, according to one embodiment of the disclosure, the smart hub can communicate with other smart hubs of the IoT system to form a hub group. The smart hubs belonging to the hub group can concurrently perform scanning and share data with each other, so can achieve great cooperation. As described above, the smart hub according to the embodiments of the disclosure can definitely achieve great technical effects.

Figure 3:
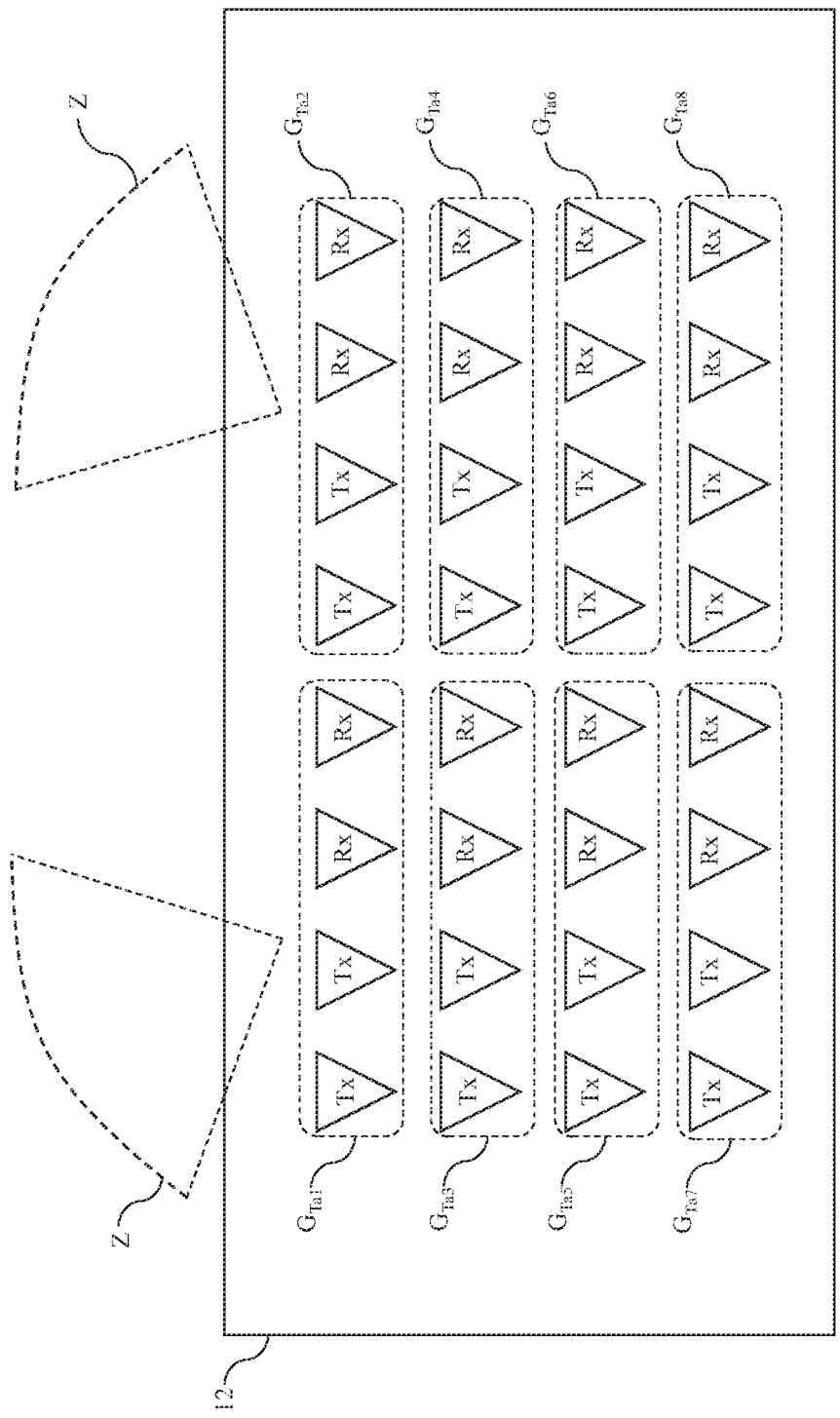
FIG. 3 is a first schematic view of a smart antenna array of the smart hub in according to one embodiment of the disclosure.

Please refer to FIG. 3, which is a first schematic view of a smart antenna array of the smart hub in according to one embodiment of the disclosure. As shown in FIG. 3, the smart antenna array 12 may include a number of antenna units to form one or more sub-antenna arrays. This embodiment illustrates the smart antenna array 12 by 4×8 antenna array. The control circuit 11 can set a plurality of sectorial zones (the sectorial zones may be, but not limited to, a sectorial space having a solid angle) and simultaneously controls the sub-antenna arrays to respectively scan the sectorial zones so as to scan these sectorial zones at the same time. The smart antenna array 12 may include a phase shifter and the parameters of the phase shifter can be changed to adjust the angle of each sectorial zone Z (e.g. 15°, 30°, 60°, 90°, 120° or 180°). In this way, one smart hub 1 can scan several sectorial sectors Z in order to search for several sensors R.

As shown in FIG. 3, one group consists of four antenna units of the smart antenna array 12, so there are eight sub-antenna arrays $G_{Ta1} \sim G_{Ta8}$ (all of the sub-antenna arrays $G_{Ta1} \sim G_{Ta8}$ are for scanning detection) so as to execute scanning for eight sectorial zones Z. According to FIG. 3, each of the sub-antenna arrays $G_{Ta1} \sim G_{Ta8}$ includes two transmitter units TX and two receiver units RX. However, FIG. 3 is just an example, the transmitter units and the receiver units can be combined with each other by a circulator, such that each of the sub-antenna arrays $G_{Ta1} \sim G_{Ta8}$ has four antenna units capable of receiving or transmitting signals at the same time. As mentioned previously, the control circuit 11 can switch the smart antenna array 12 to make the smart antenna array 12 be able to respectively or concurrently perform scanning function and wireless power transferring function. If there are several sensors R in one sectorial zone Z, the sub-antenna array corresponding to the sectorial zone Z can performing scanning for the sensors R, performing wireless power transferring for the sensors R, receiving the device information of the sensors R and activating the sensors R one by one. The 4×8 antenna array can provide a scanning mode performed by up to sixteen sub-antenna arrays $G_{Ta1} \sim G_{Ta16}$ formed by sixteen transmitter units TX and sixteen receiver units RX. Each of the sub-antenna arrays $G_{Ta1} \sim G_{Ta16}$ has one transmitter unit TX and one receiver unit RX Similarly, the transmitter unit and the receiver unit can be combined with each other by a circulator, such that each of the sub-antenna arrays $G_{Ta1} \sim G_{Ta16}$ has two antenna units capable of receiving or transmitting signals at the same time.

Figure 4:
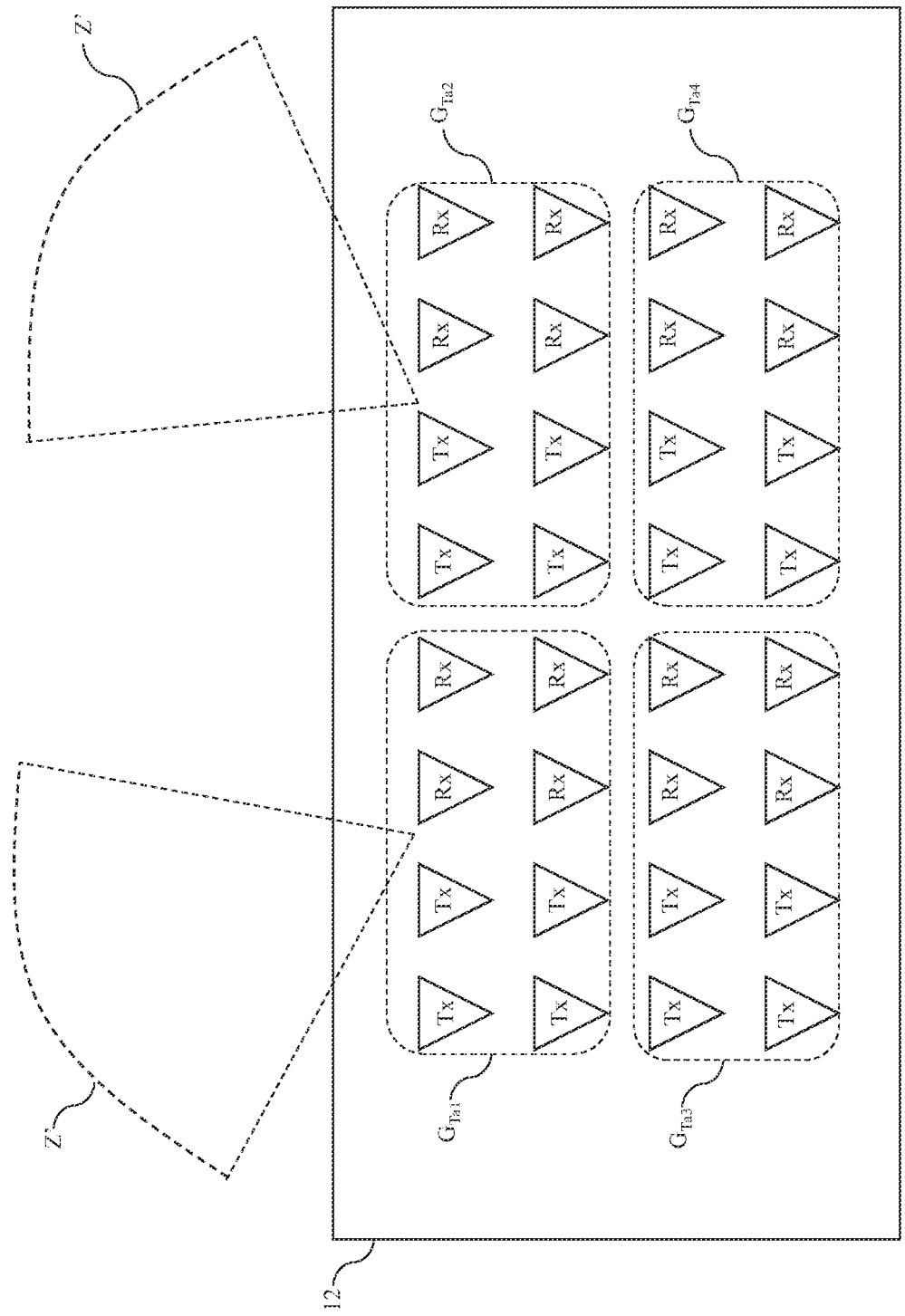
FIG. 4 is a second schematic view of the smart antenna array of the smart hub in according to one embodiment of the disclosure.

Please refer to FIG. 4, which is a second schematic view of the smart antenna array of the smart hub in according to one embodiment of the disclosure. As shown in FIG. 4, the control circuit 11 can increase the scanning distance of each sub-antenna array by increasing the number of the transmitter antenna units TX and the number of the receiver antenna units RX of the sub-antenna array. In this embodiment, one group consists of eight antenna units of the smart antenna array 12, so there are four sub-antenna arrays $G_{Ta1} \sim G_{Ta4}$ (all of the sub-antenna arrays $G_{Ta1} \sim G_{Ta4}$ are for scanning detection). According to FIG. 4, each of the sub-antenna arrays $G_{Ta1} \sim G_{Ta4}$ includes four transmitter units TX and four receiver units RX. However, FIG. 4 is just an example, the transmitter units and the receiver units can be combined with each other by a circulator, such that each of the sub-antenna arrays $G_{Ta1} \sim G_{Ta4}$ has eight antenna units capable of receiving or transmitting signals at the same time. In this case, the smart antenna array 12 can scan four sectorial zones Z' in order to increase the scanning distance thereof. In another embodiment, one group consists of sixteen antenna units of the smart antenna array 12, so there are two sub-antenna arrays $G_{Ta1} \sim G_{Ta2}$ (all of the sub-antenna arrays $G_{Ta1} \sim G_{Ta2}$ are for scanning detection). Each of the sub-antenna arrays $G_{Ta1} \sim G_{Ta2}$ includes eight transmitter units TX and eight receiver units RX. However, the configuration is just an example, the transmitter units and the receiver units can be combined with each other by a circulator, such that each of the sub-antenna arrays $G_{Ta1} \sim G_{Ta2}$ has sixteen antenna units capable of receiving or transmitting signals at the same time. In this case, the smart antenna array 12 can scan two sectorial zones Z' in order to further increase the scanning distance thereof. In still another embodiment, one group consists of thirty-two antenna units of the smart antenna array 12, so there are only one sub-antenna array $G_{Ta1}$ (serves as scanning detection array). The sub-antenna array $G_{Ta1}$ includes sixteen transmitter units TX and sixteen receiver units RX. However, the configuration is just an example, the transmitter units and the receiver units can be combined with each other by a circulator, such that the sub-antenna array $G_{Ta1}$ has thirty-two antenna units capable of receiving or transmitting signals at the same time. In this case, the smart antenna array 12 can scan only one sectorial zones Z' in order to maximize the scanning distance thereof (on the condition that the all antenna units have the same upper-bound of power). Via the above mechanism, the smart antenna array 12 can gradually scan from near to far.

Figure 5:
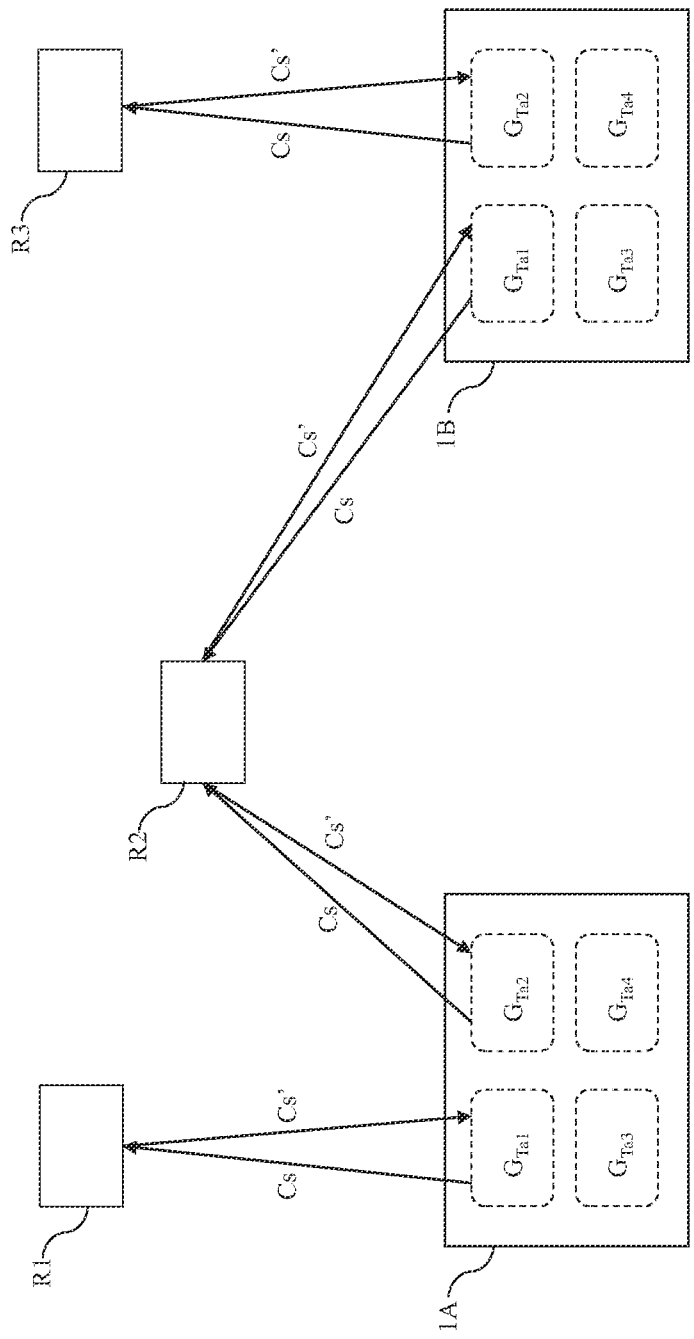
FIG. 5 is a first schematic view of a hub group formed by several smart hubs in according to one embodiment of the disclosure.

Please refer to FIG. 5, which is a first schematic view of a hub group formed by several smart hubs in according to one embodiment of the disclosure. As shown in FIG. 5, several smart hubs form a hub group. A sensor R1 is inside the scanning range of the smart hub 1A; a sensor R3 is inside the scanning range of the smart hub 1B; a sensor R2 is inside both of the scanning range of the smart hub 1A and the scanning range of the smart hub 1B. Since the smart hub 1A is closer to the sensor R2, the smart hub 1A may receive stronger reflected signal Cs' from the sensor R2. In this case, the smart hub 1A and the smart hub 1B can settle that the smart hub 1A serves as the master device of the sensor R2 after exchanging information with each other.

Figure 6:
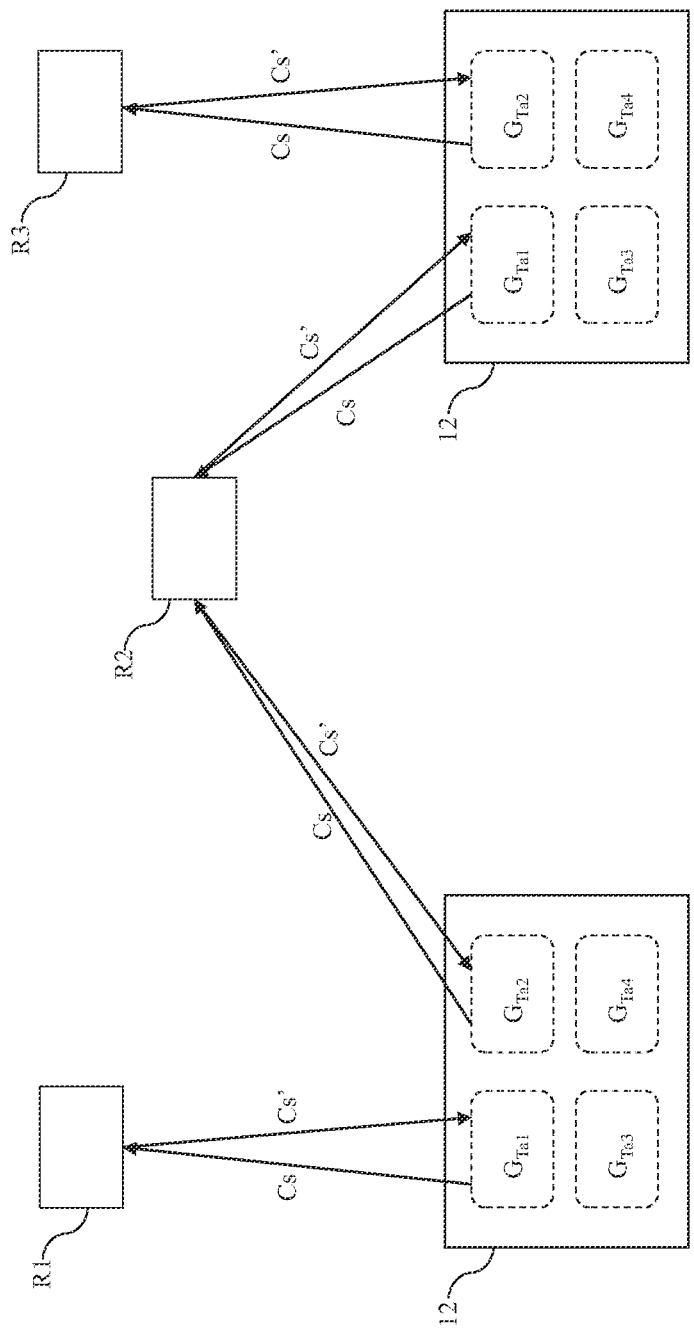
FIG. 6 is a second schematic view of a hub group formed by several smart hubs in according to one embodiment of the disclosure.

Please refer to FIG. 6, which is a second schematic view of a hub group formed by several smart hubs in according to one embodiment of the disclosure. As shown in FIG. 6, when the sensor R2 moves toward the smart hub 1B and is away from the smart hub 1A originally serving as the master device, the strength of the reflected signal Cs' received by the smart hub 1B must be greater than the strength of the reflected signal Cs' received by the smart hub 1A. In this case, the smart hub 1A can hand over the role of the master device to the smart hub 1B after the smart hub 1A and the smart hub 1B exchange information with each other.

The embodiment just exemplifies the disclosure and is not intended to limit the scope of the disclosure. Any equivalent modification and variation according to the spirit of the disclosure is to be also included within the scope of the following claims and their equivalents.

According to one embodiment of the disclosure, the smart hub can scan the surroundings to search for the sensors of an IoT system via an antenna array and transmits a wireless power transfer signal to charge any one of the sensors in battery-exhausted state. Thus, the sensor can swiftly obtain enough electricity and be activated in a short time, which can effectively decrease the demand of manpower and reduce the cost of the IoT system.

According to one embodiment of the disclosure, the smart hub can identify the sensor belonging to the IoT system via a special RFID-like communication mode. Therefore, the smart hub can correctly identify the sensor even if the sensor has not been activated yet and the smart hub can keep transmitting the wireless power transfer signal to the sensor in battery-exhausted state via the antenna array in order to charge the sensor. Accordingly, the IoT system can always work normally.

Also, according to one embodiment of the disclosure, the smart hub includes a smart antenna array, which can provide several scanning modes, such that the smart antenna array can scan from near to far or simultaneously perform scanning in different directions. Accordingly, the smart hub can more effectively search for the sensors belonging to the IoT system.

Further, according to one embodiment of the disclosure, the antenna array of the smart hub is of circular polarization or the scanning signal thereof has a digital identification code and/or hub identification code. Thus, the smart hub can effectively prevent the interferences from the background or other signal sources with a view to increase the detection accuracy and the scanning efficiency.

Moreover, according to one embodiment of the disclosure, the smart hub can communicate with other smart hubs of the IoT system to form a hub group. The smart hubs belonging to the hub group can concurrently perform scanning and share data with each other, so can achieve great cooperation.

Furthermore, according to one embodiment of the disclosure, the smart hub can achieve the desired technical effects without significantly increasing the cost thereof, so has high commercial value.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A smart hub, comprising:
a control circuit; and
an antenna array, connected to the control circuit and controlled by the control circuit;
wherein the antenna array transmits a scanning signal to search for a sensor, in an on state, off state, a sleep state or a battery-exhausted state, within an effective scanning range, wherein when the antenna array receives a reflected signal of the scanning signal, the control circuit controls the antenna array to keep transmitting a wireless power transfer signal, within a predetermined time interval, in a direction of receiving the reflected signal, and receives a device information generated by the sensor via backscattering within the predetermined time interval, wherein when the control circuit confirms that the device information is valid, the control circuit controls the antenna array to keep transmitting the wireless power transfer signal in the direction of receiving the reflected signal so as to charge the sensor and then activate the sensor.

2. The smart hub of claim 1, wherein the sensor comprises at least one group of retrodirective searching antennas in order to increase a strength of the reflected signal generated by reflecting the scanning signal, whereby the antenna array enhances a detection sensitivity in a direction toward the sensor, and increases a transmission distance and recognition distance of the device information generated by a RFID-like communication mode based on backscattering.

3. The smart hub of claim 1, wherein the antenna array comprises one or more sub-antenna arrays, and the control circuit enhances a scanning distance or a signal strength of each of the sub-antenna arrays by increasing a number of antenna units of the sub-antenna array.

4. The smart hub of claim 3, wherein a searching mode of the antenna array is from near to far and the number of the antenna units of the corresponding sub-antenna array increases with the scanning distance.

5. The smart hub of claim 1, wherein the antenna array comprises a plurality of sub-antenna arrays, and the control circuit sets a plurality of sectorial zones and simultaneously controls the sub-antenna arrays to respectively scan the sectorial zones.

6. The smart hub of claim 1, wherein when the antenna array receives the device information, the control circuit selectively controls all antenna units of the antenna array to serve as wireless power transfer antenna units to concentrate a beam thereof and keep transmitting the wireless power transfer signal in the direction of receiving the reflected signal so as to charge the sensor and then activate the sensor.

7. The smart hub of claim 1, wherein the antenna array is a co-channel system or a frequency-division system when the antenna array concurrently performs scanning and wireless power transferring.

8. The smart hub of claim 1, wherein the control circuit receives the device information, the control circuit judges a charge state of the sensor according to the device information, and determines a time needed for fully charging the sensor and a time needed for activating the sensor.

9. The smart hub of claim 1, wherein when a charge state of the sensor is normal and the sensor is idle, the sensor is set to be in an off status to reduce electricity consumption, wherein when the sensor needs to be activated, the smart hub transmits an instruction to activate the sensor by a RFID-like communication mode so as to execute basic communication functions.

10. The smart hub of claim 1, further comprising a second communication antenna and a communication circuit, wherein the control circuit communicates with other smart hubs via the communication circuit and the second communication antenna to form a hub group and concurrently perform scanning so as to increase a precision thereof in scanning and positioning.

11. The smart hub of claim 1, wherein two of the smart hubs concurrently scan the sensor, whereby the smart hubs are able to more precisely calculate a coordinate and a moving path of the sensor.

12. The smart hub of claim 10, wherein when the hub group receives the device information, the smart hub closest to the sensor keeps transmitting the wireless power transfer signal in the direction of receiving the reflected signal to raise an incident power density so as to charge the sensor and then activate the sensor.

13. The smart hub of claim 1, wherein the antenna array is of circular polarization so as to prevent interferences from other objects in a background in order to enhance a detection accuracy and a scanning efficiency thereof.

14. The smart hub of claim 1, wherein the device information comprises an identification code, the charge state, a safety code and/or an input/output state of the sensor.

15. The smart hub of claim 14, wherein the scanning signal has a digital identification code in order to prevent from interferences caused by electromagnetic waves generated by other active wireless signal sources in a background.

16. The smart hub of claim 14, wherein the scanning signal has a hub identification code in order to prevent from an error detection caused by two or more of the smart hubs adjacent to each other simultaneously detecting the reflected signal generated by the sensor, whereby a detection accuracy and a scanning efficiency thereof are enhanced.

17. The smart hub of claim 1, further comprising a network interface, wherein the control circuit is connected to a network via the network interface.

\* \* \* \* \*